July 4, 1944.  E. F. JACKMAN  2,352,636
FLUID SEAL AND MEANS FOR COOLING SAME
Filed Feb. 25, 1941  2 Sheets-Sheet 1
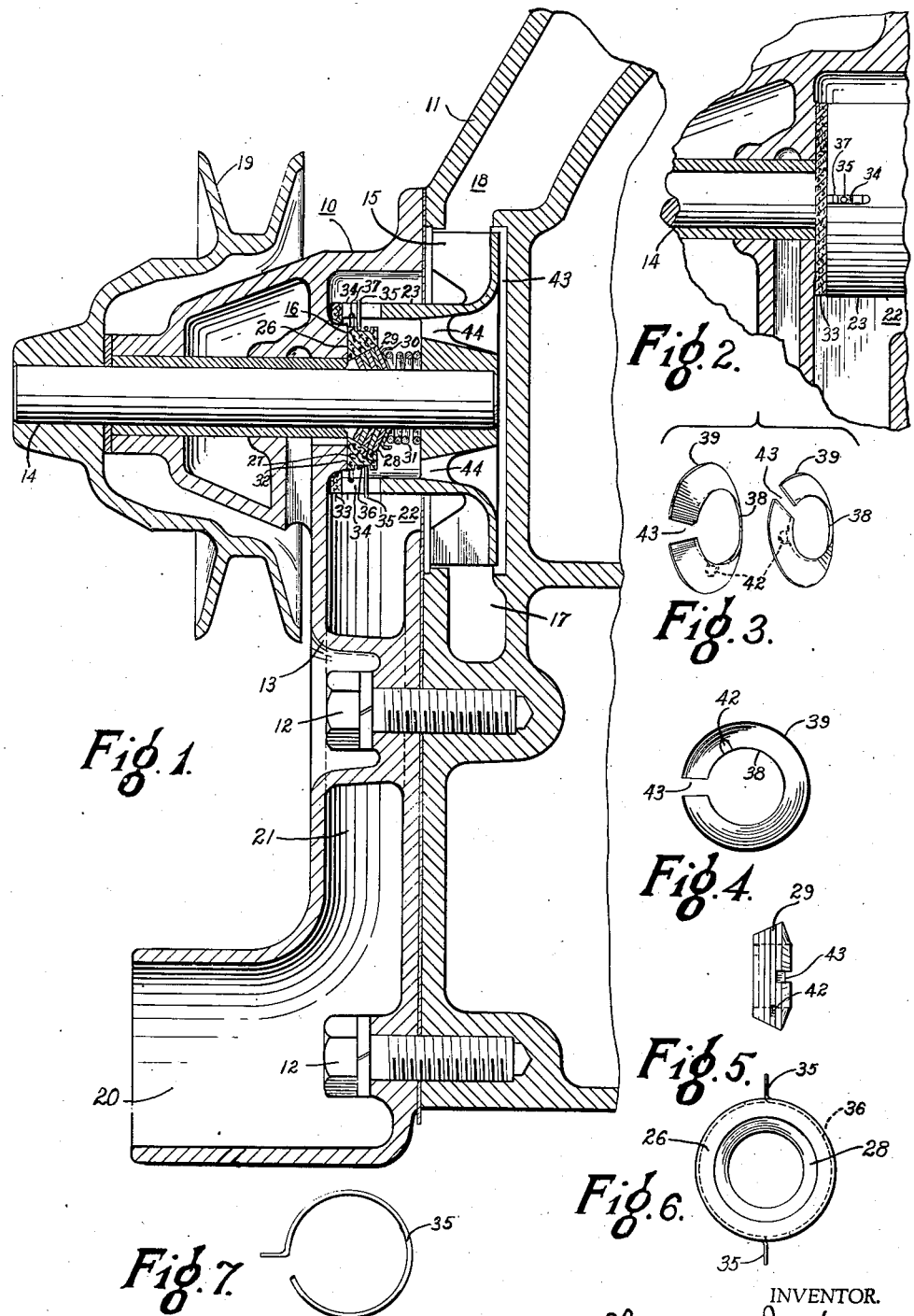
INVENTOR.
Elmer F. Jackman
BY Woodling and Krost
attys.

Patented July 4, 1944

2,352,636

UNITED STATES PATENT OFFICE 2,352,636

FLUID SEAL AND MEANS FOR COOLING SAME

Elmer F. Jackman, Lakewood, Ohio, assignor to George V. Woodling and Elmer F. Jackman, as cotrustees Application February 25, 1941, Serial No. 380,484

8 Claims. (Cl. 103—111)

My invention relates to a fluid seal adapted to create a seal between a shaft and a housing movable with respect to each other and to a fluid by-passing arrangement for cooling the fluid seal.

An object of my invention is the provision of a fluid seal which will withstand a long period of service without deterioration and without frequent renewal or replacement of parts.

Another object of my invention is the provision of a fluid seal which maintains a good effective seal with a relatively low pressure seal contacting engagement.

Another object of my invention is the provision of a fluid seal in which the heat generated is maintained at a relatively low value resulting from a relatively low pressure seal contacting engagement.

Another object of my invention is the provision of a fluid seal which compensates for wear and which is constructed of material which is substantially non-compressible in a longitudinal direction of the shaft.

Another object of my invention is the provision of a fluid seal adapted to create a seal between the shaft and a housing, in which a portion of said seal designated as a shaft sealing device sealingly engages another portion of said fluid seal designated as a housing sealing member which sealingly engages the housing.

Another object of my invention is the provision of a fluid seal in which the portion designated as the shaft sealing device is constructed of substantially non-compressible material in a direction longitudinally of the shaft.

Another object of my invention is the provision of a fluid seal which effectively seals air as well as liquid.

Another object of my invention is the provision of employing the liquid being pumped for cooling my fluid seal.

Another object of my invention is the provision of a fluid by-passing arrangement for cooling my fluid seal by re-circulating the fluid being pumped into contact with my fluid seal.

Another object of my invention is the provision of providing a continuous and a controlled flow of the recirculated fluid into contact with my fluid seal for cooling same.

Another object of my invention is the provision of substantially excluding the reduced fluid pressure area in the region of the inlet of the pump from extending into contact with the fluid seal and for permitting the increased fluid pressure area in the region of the outlet of the pump to extend into contact with the fluid seal to establish a fluid pressure against the fluid seal for cooling same.

Another object of my invention is the provision of restricting the reduced fluid pressure area in the region of the inlet of the pump from the inside of the hub of the impeller which substantially encloses the fluid seal.

Another object of my invention is the provision of delivering fluid to the inside of the hollow hub of the impeller which substantially encloses the fluid seal faster than the fluid can be expelled from the hollow hub to establish a fluid pressure within the hollow hub which forces the fluid therein in direct contact with the fluid seal for cooling same.

Other objects and a fuller understanding of my invention may be had by referring to the following description and claims, taken in conjunction with the accompanying drawings, in which:

Figure 1 represents a cross-sectional view of a pump embodying the features of my invention;

Figure 2 is a fragmentary portion of the pump shown in Figure 1 with the impeller hub rotated 90 degrees from the position illustrated in Figure 1;

Figure 3 represents two split flexible washers of my fluid seal which illustrates the manner in which the washers are angularly positioned or staggered with respect to each other;

Figure 4 represents a side elevational view of one of the washers of my fluid sealing device;

Figure 5 represents an assembly of a plurality of split flexible washers as shown in Figures 1, 3 and 4;

Figure 6 represents a side elevational view of an annular housing sealing member arranged to surround the shaft and sealingly engage the housing of the pump;

Figure 7 is a side elevational view of an external spring clip arranged to surround the annular housing sealing member.

Figure 8:
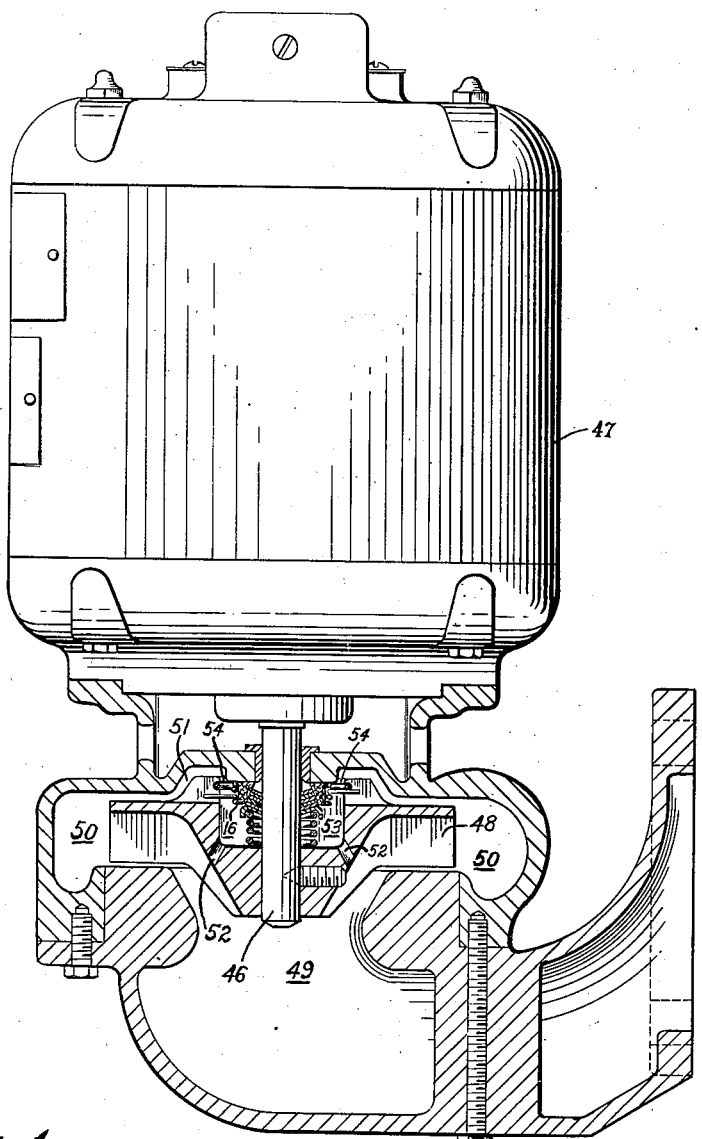
Figure 8 is a cross-sectional view of a modified form of a pump embodying the features of my invention.

With reference to Figure 1 of the drawings, my invention is arranged to be embodied in a pump of the type which is employed for recirculating the cooling fluid or water through an engine block. The pump comprises a detachable part indicated generally by the reference character 10 and is arranged to be detachably connected to the side of an engine block 11 by means of suitable cap screws 12 or any other convenient means.

The detachable part 10 of the pump comprises a pump inlet housing 13, a rotatively mounted shaft 14 driven by a driving pulley 19, and an impeller 15 non-rotatively mounted upon the shaft 14, and a fluid seal represented generally by the reference character 16. The impeller 15 is arranged to rotate in an impeller chamber within the engine block 11. Around the impeller is a peripheral circulating passage 17 which communicates with the pump outlet 18. In operation, the cooling fluid or water of the engine block is drawn into a hose connection portion 20 after which the cooling fluid flows through an inlet passage 21 to the pump inlet 22 which comprises an annular opening around the hub 23 of the impeller. The rotation of the impeller draws the fluid through the inlet 22 into the impeller chamber after which the impeller blades force the fluid outwardly into the peripheral circulating passage 18 and thence into the outlet 18 which communicates with the water or fluid jacket of the engine block.

My fluid seal 16 is adapted to create a seal between the shaft 14 and the housing 13 of the detachable part 10 of the pump. As illustrated in Figure 1, my fluid seal comprises an annular housing sealing member 26, a plurality of split flexible washers 29, a retainer washer 30, and a spring 31. The left-hand face 27 of the annular housing sealing member 26 is arranged to sealingly engage a flat sealing surface 32 of the housing. The seal effected between the annular housing sealing member 26 and the flat sealing surface 32 of the housing may be characterized as the housing seal. The plurality of split flexible washers 29 provide the seal between the shaft 14 and the annular housing sealing member 26 and thus may be characterized as a shaft sealing device. As illustrated, the annular housing sealing member 26 is provided with an internal conical surface 28 whereby the internal conical surface 28 and the shaft 14 together define a tapering annular space surrounding the shaft. The plurality of split flexible washers 29 surround and sealingly engage the shaft and also sealingly fit within the tapering annular space between the shaft and the internal conical surface 28 of the annular housing sealing member 26. The plurality of split flexible washers are of truncated conical form and are nested together with their adjacent conical surfaces coinciding. Each of the split washers has an internal edge surface 38 arranged to sealingly engage the shaft 14 and an outer edge surface 39 arranged to sealingly engage the internal conical surface 28 on the annular housing sealing member 26. The spring 31 and the retainer washer 30 which surround the shaft 14 urge the plurality of nested washers longitudinally of the shaft toward the smaller end of the tapering annular space. The plurality of nested washers are held against longitudinal movement with reference to the annular housing sealing member 26 solely by the engagement of the edge surfaces of the individual washers against the shaft and the internal conical surface 28 of the annular housing sealing member 26. The urging force of the spring 31 is also transmitted to the annular housing sealing member 26 and urges the latter against the flat sealing surface 32 of the pump housing. As illustrated in Figures 3 and 5, the flexible split washers are angularly disposed or staggered with reference to each other. In their nested assembled relationship, each of the washers are prevented from angularly slipping or rotating with each other by means of a boss 42 which fits in the space 43 between the free ends of the washer. That is to say, the boss 42 upon the right-hand washer in Figure 3 would fit between the space 43 between the ends of the washer upon the left-hand side of Figure 3. The amount of the staggering between each washer is equal to the circumferential distance between the boss 42 and the space 43 between the free ends of the washer. The split washers 29 are made of material having good wearing quality. The nature of the material depends upon the particular application of the invention. Under certain applications, the applicant finds that phenolic laminated products or phenol condensation products make a good material. Fibrous and plastic materials also may be used. In other applications certain metals and alloys may be employed. Tests show that excellent operating results are obtained with materials possessing durable wearing qualities and having the property of being radially yieldable when in the shape of a split washer and substantially non-compressible in a longitudinal direction. The shaft sealing device as illustrated herein and comprising the plurality of split flexible washers 29 is substantially the same as that shown in my pending application, Serial No. 265,479, filed April 1, 1939, for Radially yieldable device.

As illustrated in Figure 1, the hub 23 of the impeller substantially surrounds the fluid seal 16 and thereby forms a fluid chamber for substantially enclosing my fluid seal. The left-hand end of the hollow hub 23 engages a thrust washer 33 which in addition to taking the thrust of the impeller also functions to close the chamber within the hollow hub 23. In the embodiment of my fluid seal illustrated in Figures 1 and 2, the annular housing sealing member 26 is arranged to be driven by the hub 23 of the impeller. The driving arrangement comprises two external spring clips 35, each having a circular body portion for resiliently engaging an external groove 36 around the annular housing sealing member 26 and having radially extending portions which fit into diametrically disposed slots 34 in the hollow hub 23. In operation, the annular housing sealing member 26 moves relative to the sealing surface 32 of the pump housing and the shaft sealing device comprising the plurality of split flexible washers 29 remain in a non-rotative position with respect to the shaft 14. In my invention, however, the annular housing sealing member 26 need not be driven by the hollow hub 23 in which event the relative movement between the parts of my fluid seal may occur where there is the least amount of friction. Thus, in the absence of a driving arrangement for driving the annular housing sealing member 26, relative movement may occur between the shaft 14 and the inside of the plurality of split washers, or relative movement may occur between the outer surface of the plurality of split washers and the internal conical surface 28 of the annular housing sealing member, or relative movement may occur between the annular housing sealing member 26 and the flat sealing surface 32 of the housing.

For assembly purposes, my fluid seal is retained within the hollow hub 23 by means of an internal spring clip 37 which fits within an internal groove provided within the hollow hub 23. Prior to mounting the shaft and the impeller into the pump housing, the internal spring clip 37 prevents the radial extension of the external spring clips 35 from being urged longitudinally out of the diametrically disposed slots 34. After the assembly of the shafts and the impeller within the housing of the pump, the internal spring clip 37 does not perform any function because the annular housing sealing member 26 is held against longitudinal movement by the engagement with the flat sealing surface 32 of the housing.

In addition to functioning as part of the driving means between the hollow hub 23 and the annular housing sealing member 26, the diametrically disposed slots 34 operate to provide a restricted fluid communication from the inside of the hollow hub 23 to the outside of the hollow hub 23 in the region of the pump inlet 22. The size of the openings afforded by the diametrically disposed slots 34 of the hollow hub 23 has a bearing upon the operation of my fluid by-passing arrangement for cooling the fluid seal. The chamber within the hollow hub 23 is connected by a communicating fluid by-pass to the outlet 18 of the pump. The communicating fluid by-pass includes the openings 44 arranged around the shaft 14 and the space 43 between the right-hand side of the impeller 15 and the left-hand side of the impeller chamber in the engine block. The communicating fluid by-pass extending from the outlet 18 to the inside of the hollow hub 23 may be referred to as the first communicating fluid by-pass. The openings afforded by the diametrically disposed slots 34 may be referred to as the second communicating fluid by-pass and function to expel the fluid from within the hollow hub 23 to the decreased fluid pressure area in the region of the inlet 22 to maintain a circulation of the fluid through the hub from the increased fluid pressure area in the region of the outlet 18 of the pump to the decreased fluid pressure area in the region of the inlet 22. The diametrically disposed slots 34 are substantially radially of the annular housing sealing member so that the fluid just prior to being expelled from the hollow hub 23 flows past the annular housing sealing member to produce an efficient cooling action. In my invention, the second communicating fluid by-pass as afforded by the opening in the diametrically disposed slots 34 is restricted for substantially excluding the reduced fluid pressure area in the region of the inlet 22 of the pump from extending into the hollow hub and for permitting the increased fluid pressure area in the region of the outlet 18 of the pump to extend into the hollow hub and establish a fluid pressure therein which forces the fluid within the hollow hub in contact with the fluid seal to cool same. In other words, the first communicating fluid by-pass delivers fluid to the inside of the hollow hub 23 faster than the second communicating fluid by-pass can expel it therefrom. Thus, a fluid pressure is established within the hollow hub which causes the water therein to come in close contact with the fluid seal for cooling same. The reduced fluid pressure area in the region of the inlet 22 for the pump, which is less than atmospheric pressure, will be restrained from entering the hollow hub 23 and thereby prevents any air from being drawn into the pump along the shaft 14 and past the fluid seal 16. The prevention of air from entering the pump is an important feature of my invention in that the fluid for cooling the engine is free from air and reduces the amount of rusting within the water jacket of the engine. Tests show that the amount of pressure which can be built up within the hollow hub 23 can be varied by changing the relationship between the first communicating fluid by-pass and the second fluid communicating by-pass. Tests further show that the pressure established within the hollow hub 23 remains substantially constant regardless of the impeller's speed. That is to say, the differential pressure existing between the outlet 18 and the inlet 22 which provides for circulating the fluid to the hollow hub into contact with the fluid seal remains substantially the same for wide variations in the speed of the impeller.

The employment of the diametrically disposed slots 34 makes an efficient design for the second communicating fluid by-pass, and it is to be understood that the second communicating fluid by-pass may be effected by making holes in the hollow hub 23 of the impeller instead of employing the diametrically disposed slots 34. In this latter arrangement the driving means for driving the angular housing sealing member 26 would be accomplished by means other than the use of the diametrically disposed slots 34. In my invention, the pressure within the hollow hub 23 may be maintained at any value above atmospheric pressure depending upon the conditions desired. In actual operation, I find that a few pounds above atmospheric pressure gives good results so far as the cooling is concerned and at the same time prevents air from being drawn into the pump along the impeller shaft. With the pressure within the hollow hub 23 maintained slightly above atmospheric pressure, the tendency is for the fluid to leak outwardly rather than for the air to be drawn inwardly into the pump.

While I make provision for cooling the fluid seal, yet I find that the construction of my seal is such that very little heat is generated by reason of the fact that the spring 31 need only to exert a very slight pressure upon the plurality of split flexible washers and the annular housing sealing member 26 to effect a good seal. In my invention, the spring 31 is relieved of carrying the thrust load upon the impeller shaft for the reason that the thrust load is taken up by the thrust washer 33. I find from an actual embodiment of my invention that the spring load upon the spring 31 may be in the neighborhood of 5 or 6 pounds, or less, which means that very little heat is generated resulting from the relatively movable parts of my fluid seal.

The fluid pump as shown in Figure 1 is of the type where the reduced fluid pressure area acting upon the impeller tends to force the impeller and the hollow hub 23 to the left in the drawings against the thrust washer 33. In Figure 8 of the drawings I illustrate a pump wherein the construction requires no thrust washer in the pump construction since the reduced fluid pressure area in the inlet 49 tends to draw the impeller shaft downwardly. In Figure 8 the motor 47 drives the impeller 48 directly by the shaft 46 and thus the motor bearings are designed to take care of the thrust upon the shaft 46 produced by the reduced pressure area in the region of the inlet 49 acting upon the impeller 48. In Figure 8, the arrangement of my fluid seal is the same as that described with reference to the previous views of the drawings and like parts are designated by like reference characters. The internal chamber 53 of the impeller hub in Figure 8 is connected in communicating fluid by-pass relationship with the outlet 50 of the pump housing. The communicating fluid by-pass between the internal chamber 53 of the impeller hub and the outlet 50 of the pump is designated by the reference character 51 and comprises the space between the impeller 48 and the impeller housing of the pump. This communicating fluid by-pass may be characterized as the first communicating fluid by-pass. The internal chamber 53 of the impeller hub is connected to the region in the neighborhood of the pump inlet 49 through openings 52 which may be characterized as the second communicating fluid by-pass. The first communicating fluid by-pass is arranged to deliver fluid to the inside of the internal chamber 53 of the impeller hub faster than the second communicating fluid by-pass 52 can expel the fluid within the hollow hub into the region surrounding the inlet 49 of the pump. This establishes a fluid pressure within the internal chamber 53 of the impeller hub for forcing the circulating water into direct contact with the fluid seal for cooling same. The first communicating fluid by-pass may be controlled or governed by fixing or establishing the clearance at the reference character 54 between the inside circumference of the internal chamber 53 of the impeller hub and the downward extension upon the pump housing. The second communicating fluid by-pass may be controlled or regulated by establishing the size of the openings 52. The establishment of the relationship between the first communicating fluid by-pass and the second fluid communicating by-pass determines the pressure of the fluid within the internal chamber 53 of the impeller hub. The by-passing of the fluid from the outlet 50 in the region of the increased fluid pressure area through the internal chamber 53 of the impeller hub and thence out through the inlet 49 of the pump in the region of the reduced fluid pressure area is the same as that described with reference to Figure 1 of my drawings.

I claim as my invention:

1. In a fluid pump comprising an impeller housing having an inlet and an outlet, a shaft rotatively mounted in the housing, an impeller mounted on the shaft in the impeller housing, and a fluid seal adapted to create a seal between the shaft and the housing, the improvement of a fluid by-passing arrangement for cooling the fluid seal comprising, a hollow hub for the impeller and constituting a chamber substantially enclosing the fluid seal, a first communicating fluid by-pass from the increased fluid pressure area in the region of the outlet to the hub to deliver a portion of the fluid being pumped to the inside of the hollow hub, a second communicating fluid by-pass from the inside of the hollow hub to the outside thereof to expel the fluid from within the hollow hub to the decreased fluid pressure area in the region of the inlet to maintain a circulation of the fluid through the hub from the increased fluid pressure area in the region of the outlet to the decreased fluid pressure area in the region of the inlet, said second communicating fluid by-pass from the inside of the hollow hub to the outside thereof being restricted for substantially excluding the reduced fluid pressure area in the region of the inlet from extending into the hollow hub and for permitting the increased fluid pressure area in the region of the outlet to extend into the hollow hub and establish a fluid pressure therein which forces the said fluid therein in contact with the fluid seal to cool same.

2. In a fluid pump comprising an impeller housing having an inlet and an outlet, a shaft rotatively mounted in the housing, an impeller mounted on the shaft in the impeller housing, and a fluid seal adapted to create a seal between the shaft and the housing, the improvement of a fluid by-passing arrangement for cooling the fluid seal comprising, a hollow hub for the impeller and constituting a chamber substantially enclosing the fluid seal, a first communicating fluid by-pass from the increased fluid pressure area in the region of the outlet to the hub to deliver a portion of the fluid being pumped to the inside of the hollow hub, a second communicating fluid by-pass from the inside of the hollow hub to the outside thereof to expel the fluid from within the hollow hub to the decreased fluid pressure area in the region of the inlet to maintain a circulation of the fluid through the hub from the increased fluid pressure area in the region of the outlet to the decreased fluid pressure area in the region of the inlet, said second communicating fluid by-pass offering substantially greater resistance to flow than the first communicating fluid by-pass and establishing a fluid pressure within the hollow hub which forces the said fluid therein in contact with the fluid seal to cool same.

3. In a fluid pump comprising an impeller housing having an inlet and an outlet, a shaft rotatively mounted in the housing, an impeller mounted on the shaft in the impeller housing, and a fluid seal adapted to create a seal between the shaft and the housing, the improvement of a fluid by-passing arrangement for cooling the fluid seal comprising, a fluid chamber substantially enclosing the fluid seal, a first communicating fluid by-pass from the increased fluid pressure area in the region of the outlet to the said fluid chamber to deliver a portion of the fluid being pumped to the inside of the said fluid chamber, a second communicating fluid by-pass from the inside of the said fluid chamber to the outside thereof to expel fluid from within the said fluid chamber to the decreased fluid pressure area in the region of the inlet to maintain a circulation of the fluid through said fluid chamber from the increased fluid pressure area in the region of the outlet to the decreased fluid pressure area in the region of the inlet, said second communicating fluid by-pass offering substantially greater resistance to flow than the first communicating fluid by-pass and establishing a fluid pressure within the said fluid chamber which forces the said fluid therein in contact with the fluid seal to cool same.

4. In a fluid pump comprising an impeller housing having an inlet and an outlet, a shaft rotatively mounted in the housing, an impeller mounted on the shaft in the impeller housing, and a fluid seal adapted to create a seal between the shaft and the housing, the improvement of a fluid by-passing arrangement for cooling the fluid seal comprising, a hollow hub for the impeller and constituting a chamber substantially enclosing the fluid seal, a first communicating fluid by-pass from the increased fluid pressure area in the region of the outlet to the hub to deliver a portion of the fluid being pumped to the inside of the hollow hub, a second communicating fluid by-pass from the inside of the hollow hub to the outside thereof to expel the fluid from within the hollow hub to the decreased fluid pressure area in the region of the inlet to maintain a circulation of the fluid through the hub from the increased fluid pressure area in the region of the outlet to the decreased fluid pressure area in the region of the inlet, said second communicating fluid by-pass offering substantially greater resistance to flow than the first communicating fluid by-pass and establishing a fluid pressure within the hollow hub which forces the said fluid therein in contact with the fluid seal to cool same, said second communicating fluid by-pass being located substantially radially outwardly of the fluid seal.

5. In a fluid pump comprising an impeller housing having an inlet and an outlet, a shaft rotatively mounted in the housing, an impeller mounted on the shaft in the impeller housing, and a fluid seal adapted to create a seal between the shaft and the housing, the improvement of a fluid by-passing arrangement for cooling the fluid seal comprising, a fluid chamber substantially enclosing the fluid seal, first means for delivering a portion of the fluid being pumped to the inside of the said fluid chamber, second means for expelling the fluid from the said fluid chamber to maintain a circulation of the fluid through the said chamber, said second means offering substantially greater resistance to flow than the first means.

6. In a fluid pump comprising an impeller housing having an inlet and an outlet, a shaft rotatively mounted in the housing, an impeller mounted on the shaft in the impeller housing, and a fluid seal adapted to create a seal between the shaft and the housing, the improvement of a fluid by-passing arrangement for cooling the fluid seal comprising, a hollow hub for the impeller and constituting a chamber substantially enclosing the fluid seal, first means for delivering a portion of the fluid being pumped to the inside of the hollow tube, second means for expelling the fluid from the hollow hub to maintain a circulation of the fluid through the hollow hub, said second means offering substantially greater resistance to flow than the first means.

7. In a fluid pump comprising an impeller housing having an inlet and an outlet, a shaft rotatively mounted in the housing, an impeller mounted on the shaft in the impeller housing, and a fluid seal adapted to create a seal between the shaft and the housing, the improvement of a fluid by-passing arrangement for cooling the fluid seal comprising, a hollow hub for the impeller and constituting a chamber substantially enclosing the fluid seal, a first communicating fluid by-pass from the increased fluid pressure area in the region of the outlet to the hub to deliver a portion of the fluid being pumped to the inside of the hollow hub, a second communicating fluid by-pass from the inside of the hollow hub to the outside thereof to expel the fluid from within the hollow hub to the decreased fluid pressure area in the region of the inlet to maintain a circulation of the fluid through the hub from the increased fluid pressure area in the region of the outlet to the decreased fluid pressure area in the region of the inlet, said second communicating fluid by-pass offering substantially greater resistance to flow than the first communicating fluid by-pass and establishing a fluid pressure within the hollow hub which forces the said fluid therein in contact with the fluid seal to cool same, said second communicating fluid by-pass being located substantially radially outwardly of the fluid seal, and driving means for causing the hub to rotate the fluid seal, said driving means comprising means secured to the fluid seal and extending substantially radially outwardly into the said second communicating fluid by-pass of the said hub.

8. In a fluid pump comprising an impeller housing having an inlet and an outlet, a shaft rotatively mounted in the housing, an impeller having a hollow hub mounted on the shaft in the impeller housing, the combination of a fluid seal mounted within the hollow hub and adapted to create a seal between the shaft and the housing and a by-passing arrangement for cooling the fluid seal, said fluid seal comprising an annular housing sealing member arranged to surround said shaft and sealingly engage the housing, a shaft sealing device disposed to sealingly engage said shaft and to sealingly engage said annular housing sealing member, driving means for causing the hub to rotate the annular housing sealing member, said by-passing arrangement comprising a first communicating fluid by-pass from the increased fluid pressure area in the region of the outlet to the hub to deliver a portion of the fluid being pumped to the inside of the hollow hub, a second communicating fluid by-pass from the inside of the hollow hub to the outside thereof to expel the fluid from within the hollow hub to the decreased fluid pressure area in the region of the inlet to maintain a circulation of the fluid through the hub from the increased fluid pressure area in the region of the outlet to the decreased fluid pressure area in the region of the inlet, said second communicating fluid by-pass offering substantially greater resistance to flow than the first communicating fluid by-pass and establishing a fluid pressure within the hollow hub which forces the said fluid therein in contact with the fluid seal to cool same.

ELMER F. JACKMAN.